(12) United States Patent
Chen et al.

(10) Patent No.: US 9,513,873 B2
(45) Date of Patent: Dec. 6, 2016

(54) COMPUTER-ASSISTED RELEASE PLANNING

(71) Applicant: International Business Machines Corporation, Armonk, NY (US)

(72) Inventors: Hao Chen, Beijing (CN); Claudio Cozzi, Foster City, CA (US); Ya B. Dang, Beijing (CN); Howard M. Hess, Winnetka, IL (US); Steven M. Kagan, Burr Ridge, IL (US); Feng Li, Beijing (CN); Shao C. Li, Beijing (CN); Xin Zhou, Beijing (CN); Jun Zhu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/453,685

(22) Filed: Aug. 7, 2014

(65) Prior Publication Data

US 2015/0095875 A1 Apr. 2, 2015

(30) Foreign Application Priority Data

Sep. 29, 2013 (CN) .......................... 2013 1 0456529

(51) Int. Cl.
  G06F 9/44 (2006.01)
  H04L 29/06 (2006.01)
  G06Q 10/06 (2012.01)
(52) U.S. Cl.
  CPC ............ G06F 8/10 (2013.01); G06Q 10/0631 (2013.01); H04L 67/42 (2013.01)
(58) Field of Classification Search
  None
  See application file for complete search history.

(56) References Cited

U.S. PATENT DOCUMENTS 7,103,871 B1  9/2006 Kirkpatrick et al.
7,860,737 B2 * 12/2010 Jordan et al. .......... G06Q 10/04
                                                  705/7.22
(Continued)

FOREIGN PATENT DOCUMENTS

EP        2 199 901       6/2010
WO    WO2011031328       3/2011

OTHER PUBLICATIONS

Par Carlshamre, "Release Planning in Market-Driven Software Product Development: Provoking an Understanding", Publsihed in "Requirements Engineering", Jul. 2002:139-151.*

(Continued)

Primary Examiner — Wei Zhen
Assistant Examiner — Hossain Morshed
(74) Attorney, Agent, or Firm — Schmeiser, Olsen & Watts, LLP; John Pivnichny

(57) ABSTRACT

A compute-implemented method and apparatus for assisting release planning, including steps of: obtaining remaining requirements that are expected to be included in a current release plan; obtaining the release plan, which comprises a set of planned requirements that are already included in the release plan and a set of release constraints; determining that there is a conflict between the release constraints and the planned requirements; rendering, in response to this determination, a proposal to create a modified release plan that is a function of the remaining requirements and of the current release plan; and forecasting, as a function of the remaining requirements and of the modified release plan, whether the addition of another requirement to the release plan would create a conflict with the release constraints.

19 Claims, 8 Drawing Sheets

(56) References Cited

U.S. PATENT DOCUMENTS

| | | | |
|---|---|---|---|
| 7,921,027 | B2 | 4/2011 | Jordan et al. |
| 8,006,222 | B2 | 8/2011 | Ruhe |
| 8,191,044 | B1* | 5/2012 | Berlik ................. G06F 11/3672 |
| | | | 717/102 |
| 8,209,211 | B2 | 6/2012 | Engle et al. |
| 8,306,841 | B2 | 11/2012 | Clarke et al. |
| 8,332,251 | B1* | 12/2012 | Morris .................. G06Q 10/06 |
| | | | 705/7.22 |
| 2003/0065415 | A1* | 4/2003 | Hegde et al. .......... G06Q 10/06 |
| | | | 700/100 |
| 2003/0229522 | A1* | 12/2003 | Thompson et al. . G06Q 10/067 |
| | | | 705/4 |
| 2005/0114829 | A1* | 5/2005 | Robin et al. ........... G06Q 10/06 |
| | | | 717/101 |
| 2005/0210442 | A1* | 9/2005 | Seetharaman et al. G06Q 10/04 |
| | | | 717/101 |
| 2005/0216486 | A1* | 9/2005 | Barshefsky et al. ...... G06F 8/65 |
| 2005/0216879 | A1* | 9/2005 | Ruhe ...................... G06Q 10/10 |
| | | | 717/101 |
| 2007/0006122 | A1 | 1/2007 | Bailey et al. |
| 2008/0103848 | A1* | 5/2008 | Santos et al. .......... G06Q 10/06 |
| | | | 705/7.12 |
| 2008/0270210 | A1* | 10/2008 | Kratschmer et al. ............. 705/7 |
| 2009/0192981 | A1* | 7/2009 | Papaemmanouil |
| | | | et al. ................. G06F 17/30516 |
| 2010/0010856 | A1 | 1/2010 | Chua et al. |
| 2010/0131329 | A1* | 5/2010 | An et al. ................. G06Q 50/06 |
| | | | 705/63 |
| 2011/0125544 | A1* | 5/2011 | Shtub ..................... G06Q 10/06 |
| | | | 705/7.23 |
| 2011/0125553 | A1* | 5/2011 | Mazzoleni et al. .... G06Q 10/00 |
| | | | 705/7.37 |
| 2011/0239189 | A1* | 9/2011 | Attalla ....................... G06F 8/65 |
| | | | 717/121 |
| 2011/0295754 | A1 | 12/2011 | Mohamed |
| 2012/0232944 | A1* | 9/2012 | Zhu .................. G06Q 10/06311 |
| | | | 705/7.14 |
| 2014/0195029 | A1* | 7/2014 | Chang .................... G06Q 10/06 |
| | | | 700/97 |
| 2015/0095875 | A1* | 4/2015 | Chen ........................ G06F 8/10 |
| | | | 717/101 |

OTHER PUBLICATIONS

Carlshamre-NPL-2002, "Release Planning in Market-Driven Software Product Development"—Par Carlshamre, 2002.*
NPL-Bosch-lnterger Programming, located at http://www.inf.ufpr.br/aurora/disciplinas/topicosia2/livros/search/integer.pdf 2015.*
NPL—Annonymous—Interger Linear Programming, located at http://www.doc.ic.ac.uk/-br/berc/integerprog.pdf 2015.*
NPL—Annonymous2—Knapsack Problem, located at http://www.or.deis.unibo.it/kp/Chapter2.pdf 2015.*
ReleasePlanner—Axosoft Support. Located at https://www.axosoft.com/support/releases/planner 2016.*
Carlshamre-NPL-2002, Par Carlshamre, "Relaease Planning", Reqyurements Eng (2002) 7:139-151 2002.*
U.S. Appl. No. 14/497,457, filed Sep. 26, 2014.
Bohner et al., (Book) Software Change Impact Analysis, 1996, IEEE Computer Society Press, Los Alamitos, CA.
Boehm et al., (Book) Software Engineering Economics, Englewood Cliffs, NJ: Prentice-Hall, 1981, ISBN 0-13-822122-7.
Boehm et al., (Book) Software Cost Estimation With Cocomo II, Englewood Cliffs, NJ: Prentice-Hall, 2000, ISBN 0-13-026692-2.
Linstone et al., (Book) The Delphi Method: Techniques and Applications, Reading, Mass: Adison-Wesley, ISBN 9780201042948.
Amandeep et al., Intelligent Support for Software Release Planning, Appeard in: Proceedings PROFES'2004, LNCS Vo. 3009, pp. 248-262.
Ruhe et al., Hybrid Intelligence in Software Release Planning, International Journal of Hybrid Intelligent Systems 1, (2004), pp. 99-110.
Anda et al., Estimating Software Development Effort based on Use Cases- Experiences from Industry, Oct. 2001, '01: Proceedings of the 4th International Conference on The Unified Modeling Language, Modeling Languages, Concepts, and Tools, 18 pages.
Apiwattanapong, et al., Efficient and Precise Dynamic Impact Analysis Using Execute-After Sequences, ICSE'05, May 15-21, 2005, copyright ACM 1-58113-963-2/05/0005, pp. 432-441.
Par Carlshamre, Release Planning in Market-Driven Software Product Development: Provoking an Understanding, Requirements Eng (2002) 7:139-151, copyright 2002 Springer-Verlag London Limited.
Ceccarelli, et al., An Electric Approach for Change Impact Analysis, ICSE'10, May 2-8, 2010, Cape Town, South Africa, Copyright 2010 ACM 978-1-60558-719-6/10/05, 4 pages.
Holmes et al., Approximate Structural Context Matching: An Approach to Recommend Relevant Examples, IEEE Transactions on Software Engineering, vol. 32, No. 12, Dec. 2006, pp. 952-970.
Authors: MICROSOFT, Rajagopalan, C.S., Software Tool for Analyzing Changes, Publication Date: Jun. 4, 2008, IP. com No. IPCOM000171321D, 9 pages.
Authors: Disclosed Anonymously, A Method and System for Release Planning, IP.com No. IPCOM000210356D, Publication: Aug. 31, 2011, 7 pages.
Li et al., A Business Process-driven Approach for Requirements Dependency Analysis, Sep. 2012, BPM'12: Proceedings of the 10th international conference on Business Process Management, 16 pages.
Capers Jones, Software Project Management Practices: Failure Versus Success, Project Management, Oct. 2004, www.stsc.hill.af.mil, 5 pages.
Kama et al., Extending Change Impact Analysis Approach for Change Effort Estimation in the Software Development Phase, ISBN: 978-1-61804-179-1, 2013, 7 pages.
Kersten et al., Using Task Context to Improve Programmer Productivity, SIGSOFT'06/FSE-14, Nov. 5-11, 2006, copyright ACM 2006 1-59593-468-5/06/0011, 11 pages.
Law et al., Whole Program Path-Based Dynamic Impact Analysis, Proceedings of the 25th International Conference on Software Engineering (ICSE '03), 0270-52573/03, copyright 2003 IEEE, 11 pages.
Steffen Lehnert, A Taxonomy for Software Change Impact Analysis, IWPSE-EVOL'11. Sep. 5-6, 2011, copyright 2011 ACM 978-1-4503-0848-9/11/09, 10 pages.
Li et al., A survey of code-based change impact analysis techniques, Software Testing, Verification and Reliability, Softw. Test. Verif. Reliab. (2012), Published online in Wiley Online Library (wileyonlinelibrary.com).DOI: 10.1002/ stvr.1475, 34 pages.
David Longstreet, Fundamentals of Function Point Analysis, Copyright Longstreet Consulting, Inc. 2005, www.SoftwareMetrics.Com, 9 pages.
Loyall et al., Impact Analysis and Change Management for Avionics Software, CH36015-97/0000-0740 copyright 1997 IEEE, pp. 740-747.
Roberto Meli, Measuring Change Requests to support effective project management practices, ESCOM-Metrics 2001, London, United Kingdom, Apr. 2001, 10 pages.
Rekha Narayan, Scope Change Management: Keeping Projects on Track, Technology Executives Club, IT Management-Scope Change Management, Retrieved from Internet May 22, 2014, URL: http://www.technologyexecutivesclub.com/Articles/management/artScopeChangeManagement.php, 2 pages.
James Steven O'Neal, Analyzing the Impact of Changing Software Requirements: A Traceability-Based Methodology, Clemson University, Dec. 2003, 104 pages.
James Davies, PRWeb, Accept Software Corporation Announces New Accept Planner 3 Release, copyright 2005, 3 pages.
Przepiora et al., A Hybrid Release Planning Method and its Empirical Justification, ESEM'12, Sep. 19-20, 2012, copyright 2012 ACM 978-1-4503-1056-7/12/09, pp. 115-118.
Regnell et al., Exploring Software Product Management Decision Problems with Constraint Solving- Opportunities for Prioritization and Release Planning, 978-1-4577-1147-3/11 copyright 2011 IEEE, pp. 47-56.

(56) References Cited

OTHER PUBLICATIONS

Ruhe et al., Quantitative Studies in Software Release Planning under Risk and Resource Constraints, Proceedings of the 2003 International Symposium on Empirical Software Engineering (ISESE'03), 0-7695-2002-2/03 copyright 2003 IEEE, 10 pages.

Carlshamre et al., An Industrial Survey of Requirements Interdependencies in Software Product Release Planning, 1090-705X/01 copyright 2001, IEEE, pp. 84-91.

Siba et al., Conceptual Dependency Based Requirements Clustering for Component Selection, International Journal of Advanced Research in Computer Engineering & Technology (IJARCET) vol. 2, Issue 4, Apr. 2013, pp. 1518-1522.

Ye et al., Reuse-Conductive Development Environments, Automated Software Engineering, 12, pp. 199-235, 2005.

Ochoa et al., Estimating Software Projects Based on Negotiation, Journal of Universal Computer Science, vol. 15, No. 9 (2009), pp. 1812-1832.

Caccetta et al., Computational Aspects of Hard Knapsack Problems, 0362-546X101, 201 published by Elsevier Science Ltd., PH: S0362-546X(01)00658-7, 1 page.

Amendment (Jan. 30, 2016) for U.S. Appl. No. 14/497,457, filed Sep. 26, 2014.

Office Action (Jan. 21, 2016) for U.S. Appl. No. 14/497,457, filed Sep. 26, 2014.

\* cited by examiner

Table 1

| Requirement | Property | |
|---|---|---|
| | Cost ($) | Resource (PM) |
| R1 | 2500 | 25 |
| R2 | 2800 | 8 |
| R3 | 2500 | 15 |
| R4 | 700 | 7 |
| R5 | 800 | 8 |
| R6 | 340 | 14 |
| R7 | 1300 | 13 |
| R8 | 600 | 6 |
| R9 | 900 | 9 |
| R10 | 1100 | 12 |

Table 2

| | Requirement Relationship |
|---|---|
| 1 | R1 is dependent on R2 |
| 2 | R5 and R6 are mutually exclusive |

FIG. 3

Table 3

| Constraint | Type | Description | Threshold |
|---|---|---|---|
| Budget | N | Total cost required to implement all requirements in the release | 9000$ |
| Resource | N | Total estimated resource required to implement all requirements in the release | 100PM |
| Requirement Relationship | L | If one requirement is planned to the release, all requirements on which it depended should also be planned to the release. | |

FIG. 4

COMPUTER-ASSISTED RELEASE PLANNING

TECHNICAL FIELD

The present invention relates to computer-implemented tools for improving the accuracy of a release-planning procedure.

BACKGROUND

Release planning refers to a process of identifying and selecting requirements to be satisfied by a planned product release. Selecting such requirements may be subject to constraints that are influenced by factors such as stakeholder satisfaction, release capacity, competition for resources, technical limitations, and dependencies or other relationships between requirements.

Failure to accommodate such constraints during the initial release-planning phase may create errors that are difficult or impossible to remedy during a subsequent execution of a release plan.

Furthermore, interdependencies among constraints may result in an attempt to satisfy one constraint resulting in a failure to satisfy a second constraint. Adjusting product requirements to satisfy quality-related constraints, for example, might result in an inability to meet a budget constraint.

BRIEF SUMMARY

A first embodiment of the present invention provides a method for assisting release planning, comprising:

a processor of a computer system obtaining a set of remaining requirements, wherein the set of remaining requirements is expected to be included in a release plan that comprises a set of release constraints and a set of planned requirements;

the processor receiving the release plan;

the processor determining that there is a conflict between the set of release constraints and the set of planned requirements, wherein the conflict identifies that one or more release constraints of the set of release constraints prevents satisfaction of one or more planned requirements of the set of planned requirements;

the processor rendering, in response to the determining, a proposal to modify the release plan, wherein the modification is selected a function of the set of remaining requirements and of the release plan;

the processor generating a forecast as a function of the set of remaining requirements and of the release plan, wherein the forecast predicts whether adding an additional requirement to the release plan would prevent satisfaction of any requirement of the set of planned requirements.

A second embodiment of the present invention provides a computer program product, comprising:

a computer-readable hardware storage device having a computer-readable program code stored therein, the program code configured to be executed by a processor of a computer system to implement a method for assisting release planning, a pending requirement acquisition module configured to obtain a set of remaining requirements, wherein the set of remaining requirements is expected to be included in a release plan that comprises a set of release constraints and a set of planned requirements, a release plan acquisition module configured to receive the release plan, a modification proposal rendering module configured to render a proposal to modify the release plan, wherein the modification is selected a function of the set of remaining requirements and of the release plan, and a conflict forecasting and generating module configured to generate a forecast as a function of the set of remaining requirements and of the release plan, wherein the forecast predicts whether adding an additional requirement to the release plan would prevent satisfaction of any requirement of the set of planned requirements;

the method comprising:

the pending requirement acquisition module obtaining set of remaining requirements;

the release plan acquisition module receiving the release plan, the modification proposal rendering module rendering, in response to the determining, the proposal to modify the release plan, and the conflict forecasting and generating module generating the forecast.

A third embodiment of the present invention provides a computer system comprising a processor, a memory coupled to said processor, and a computer-readable hardware storage device coupled to said processor, said storage device containing program code configured to be run by said processor via the memory to implement a method for assisting release planning, the method comprising:

the processor obtaining a set of remaining requirements, wherein the set of remaining requirements is expected to be included in a release plan that comprises a set of release constraints and a set of planned requirements;

the processor receiving the release plan;

the processor determining that there is a conflict between the set of release constraints and the set of planned requirements, wherein the conflict identifies that one or more release constraints of the set of release constraints prevents satisfaction of one or more planned requirements of the set of planned requirements;

the processor rendering, in response to the determining, a proposal to modify the release plan, wherein the modification is selected a function of the set of remaining requirements and of the release plan;

the processor generating a forecast as a function of the set of remaining requirements and of the release plan, wherein the forecast predicts whether adding an additional requirement to the release plan would prevent satisfaction of any requirement of the set of planned requirements.

BRIEF DESCRIPTION OF THE DRAWINGS

FIG. 3 is a tabular representation of exemplary requirements for an exemplary release according to an embodiment of the present invention.

FIG. 4 is a tabular representation of exemplary release constraints according to an embodiment of the present invention.

DETAILED DESCRIPTION

Figure 1:
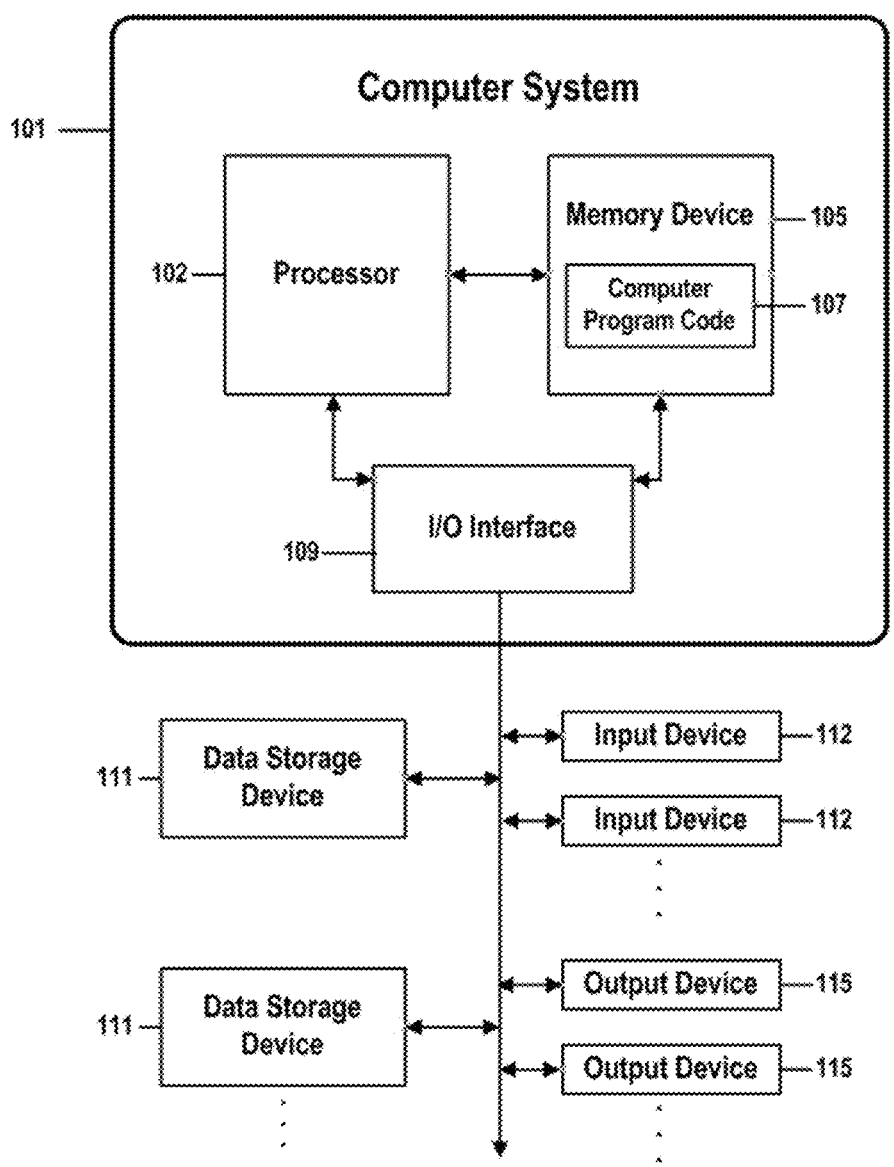
FIG. 1 shows a structure of a computer system and computer program code that may be used to implement a method for computer-assisted release planning in accordance with embodiments of the present invention.

One aspect of the present invention provides a computer-implemented method for assisting release planning, comprising: obtaining remaining requirements that are expected to be included in a release plan; obtaining the release plan, which comprises release constraints and planned requirements that are already included in the release plan; rendering a proposal to modify the release plan in response to determining that there is a conflict between the release constraints and the planned requirements, the proposal being generated according to the remaining requirements and the release plan; and rendering a forecast of whether the addition of an additional requirement into the release plan will break the release constraints, the forecast being generated according to the remaining requirements and the release plan.

In another aspect, there is provided an apparatus for assisting release planning, comprising: a pending requirement acquisition module configured to obtain remaining requirements, which are requirements that are expected to be included, but are not yet included, in a release plan; a release plan acquisition module configured to obtain the release plan, which comprises release constraints and planned requirements that are already included in the release plan; a modification proposal rendering module configured to render a proposal to modify the release plan in response to determining that there is a conflict between the release constraints and the planned requirements, the proposal being generated according to the remaining requirements and the release plan; and a conflict forecasting and rendering module configured to render a forecast of whether the addition of an additional requirement into the release plan will break the release constraints, the forecast being generated according to the remaining requirements and the release plan.

Embodiments of the present invention enable planners in the process of release planning to identify a current state of a release plan in a timely manner through human-computer interactions. By the provision of optimized proposals, the planners may identify and adopt the optimized release plan in a timely manner, thereby increasing the effectiveness and efficiency of the release planning.

Embodiments of the present invention described herein with reference to the accompanying drawings should not be construed as limiting the invention to those embodiments.

Before describing various embodiments of the present invention, some terms used in the specification of the invention will be described first.

The term "release planning" refers to a process of identifying and selecting one or more requirements that must be satisfied, within constraints, by a planned release of a product or service. Because each release of a particular product may be subject to constraints unique to that release, release-planning procedures may identify or select different sets of requirements for each release.

The term "release plan" refers to the result of release planning, and may identify a set of release constraints and a set of planned requirements. A release plan generated prior to the completion of release planning is called "current release plan". The process of release planning is one in which the current release plan is continuously updated. In the specification, unless otherwise stated, the term "release plan" will generally refer to a current release plan generated in the process of release planning.

"Planned requirements" ("PR") refer to a set of requirements that have already been included in the current release plan. In contrast, "to-be planned requirements" (or remaining requirements, abbreviated here as "RR") refer to a set of requirements that will be, but have not yet been, included into the current release plan short. The set of "planned requirements" and the set of "remaining requirements" constitute "whole requirements" ("WR"). At the beginning of a release planning procedure, "remaining requirements" and "whole requirements" denote a same set of requirements.

"Release constraints" refers to a set of conditions that must be met by a specific release. If there are plural conditions, each of them is also referred to as a "constraint" or "sub-constraint". "Release constraints" serve as initial input to a release-planning procedure and may be changed during the course of the release-planning procedure.

FIG. 1 shows a structure of a computer system and computer program code that may be used to implement a method for computer-assisted release planning in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for computer-assisted release planning in accordance with embodiments of the present invention, and may implement other embodiments described in this specification, including the methods illustrated in FIGS. 1-8. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for computer-assisted release planning.

Any of the components of the present invention could be created, integrated, hosted, maintained, deployed, managed, serviced, supported, etc. by a service provider who offers to facilitate a method for computer-assisted release planning Thus the present invention discloses a process for deploying or integrating computing infrastructure, comprising integrating computer-readable code into the computer system 101, wherein the code in combination with the computer system 101 is capable of performing a method for computer-assisted release planning.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for cross-retail marketing based on analytics of multichannel clickstream data may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for cross-retail marketing based on analytics of multichannel clickstream data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
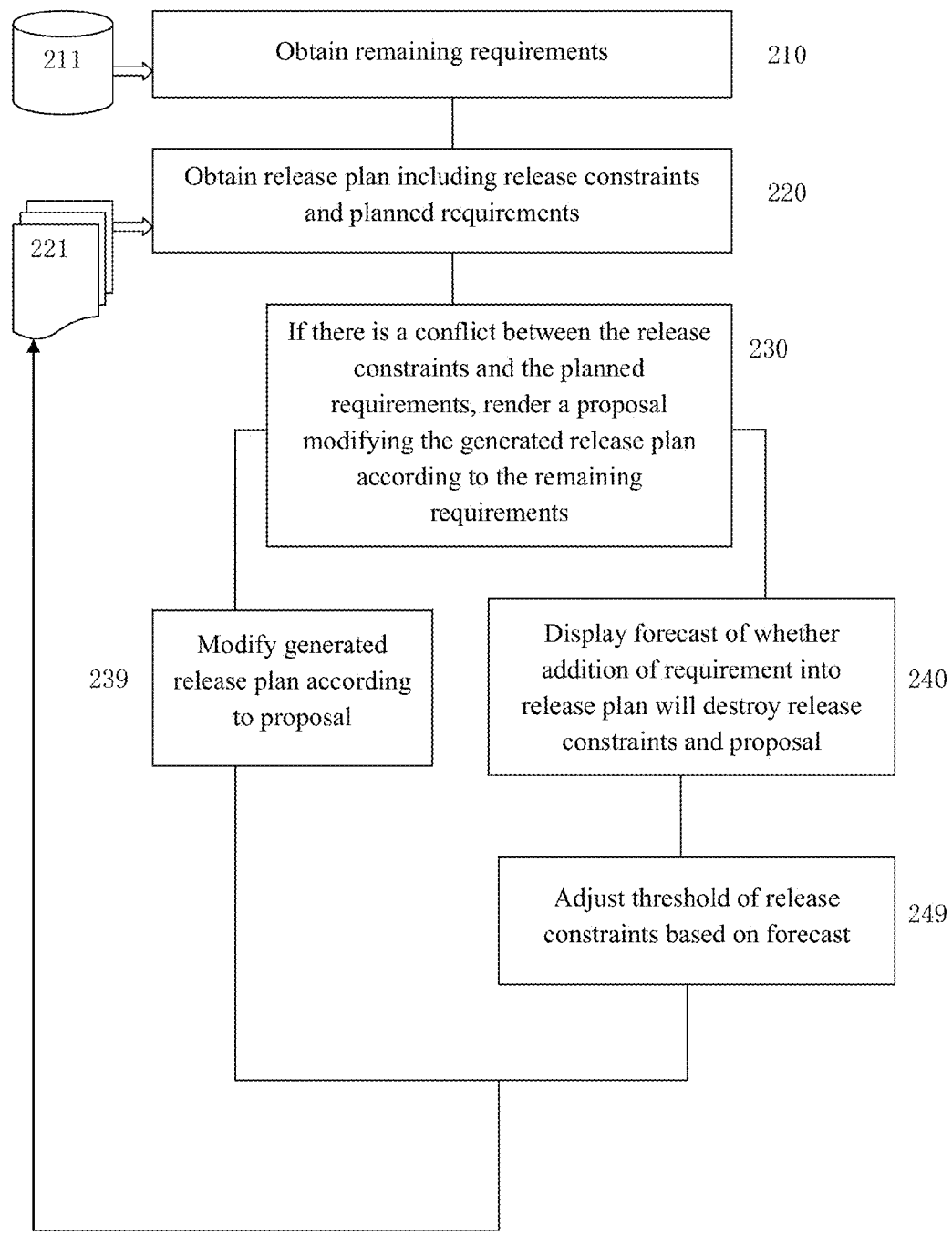
FIG. 2 is a flowchart that illustrates a computer-implemented method for assisting release planning according to an embodiment of the present invention.

FIG. 2 is a flowchart that illustrates a computer-implemented method for assisting release planning according to an embodiment of the present invention. FIG. 2 comprises steps 210-249.

As shown, the process of the computer implemented method for assisting release planning begins at Step 210. In Step 210, remaining requirements are obtained by a processor of a computer system. Remaining requirements are those requirements that are expected to be included in a release plan. In some embodiments, these requirements may be retrieved from a previously stored file 211. Step 210 is described in greater detail in the description of FIG. 3.

In Step 220, the release plan is obtained, which comprises release constraints and planned requirements. The planned requirements are those requirements that are already included in the release plan. This step is described in greater detail in the description of FIG. 4.

In Step 230, a proposal for modifying the release plan is rendered in response to, and as a function of, an identification of a conflict between the release constraints and the planned requirements. This may occur, for example, if the planned release cannot satisfy a planned requirement because of functionality, performance, or cost limitation mandated by one of the release constraints.

The processor then gives the user an opportunity to modify the release plan in response to the proposal. If the user elects to do so, the method of FIG. 2 continues with step 239 and then loops back through steps 220 and 230. If the user does not elect to do so, or if the processor in step 230 determines that there is no conflict between the release constraints and the planned requirements, the method of FIG. 2 continues with steps 240 and 240.

In Step 239, the processor allows the user to modify the release plan in response to the proposal. This modification may comprise modifying a requirement included in the current release plan or modifying a release constraint included in the current release plan. In some embodiments, these changes to the current release plan may be saved in the file 221. The procedure of steps 220, 230, and 239 may continue until the processor determines that there is no conflict between the release constraints and the planned requirements.

If the processor in step 230 determines that there is no conflict between the release constraints and the planned requirements, the method of FIG. 2 continues with steps 240 and 249.

In Step 240, the processor forecasts, as a function of the remaining requirements and the release plan, whether an addition of a new requirement to the release plan will create a conflict with the release constraints. The purpose of this step is to forecast whether the release constraints are likely to be observed if the release-planning procedure continues with the current release plan for the remaining requirements. In some embodiments, the processor in this step will display the generated forecast on the user interface.

In one embodiment, the processor generates this forecast by creating or analyzing a linear programming model created as a function of the remaining requirements and the release plan.

In one example of such an embodiment, a linear programming model, which includes decision variables, model constraint and objective, is created according to the remaining requirements and the release plan.

Decision Variables:
decision variables $D\_REQi$ respectively corresponding to each of M remaining requirements $REQi$ ($1 \leq i \leq M$) ($D\_REQi = 1$ or $0$, "1" indicating requirement $REQi$ is included in the release plan);
decision variables $D\_RLS\_Num\_Cj$ respectively corresponding to each of K constraints of numerical type $RLS\_Num\_Cj$ ($0 \leq j \leq K$) ($D\_RLS\_Num\_Cj = $ "1" or "0", "1" indicating that $RLS\_Num\_Cj$ is considered).

Model Constraint:
constraint of requirement relationship constraint such as shown in Table 2 of FIG. 3, for example, R1 is dependent on R2, R5 and R6 are mutually exclusive;
logic-typed constraint of the release constraints, $RLS\_Logic\_Cj$ ($0 \leq j \leq T$), wherein T is the number of logic-typed sub-constraints of logic type, such as the requirement relationship constraint shown in the Table 3 of FIG. 4, "If one requirement is planned to the release, all requirements on which it depends should be planned to the release";
constraint $RLS\_Mj * D\_RLS\_Num\_Cj < RLS\_Thresholdj$ respectively corresponding to each sub-constraint $RLS\_Num\_Cj$ ($0 \leq j \leq K$) of the release constraints wherein $RLS\_Mj$ is the property value of a requirement to be planned to the release that corresponds to $RLS\_Num\_Cj$, and $RLS\_Thresholdj$ is threshold value of sub-constraint $RLS\_Num\_Cj$;
$\Sigma D\_RLS\_Num\_Ci > 0$./*at least one sub-constraint of the release constraints will be destroyed*/

Objective:
MIN ($\Sigma D\_REQi/M$);/*minimize percentage of requirements that are newly added to of the release plan*/
MAX ($\Sigma D\_RLS\_Num\_Cj/K$)./*maximize percentage of sub-constraints to be changed in the release constrains of the release plan*/

In Step 244, the above linear programming model is solved on a linear programming model engine, i.e., to find out a set of values of the decision variables $D\_REQi$ ($1 \leq i \leq M$) that satisfy the model constraint and meet the objective.

In Step 246, content of the proposal is generated accordingly based on the solution of linear programming model.

Specifically, if $\Sigma D\_RLS\_NUM\_Cj < K$, then sub-constrains corresponding to $D\_RLS\_NUM\_Cj = 0$ will have the risk of being destroyed; Otherwise, there is no risk of the release constraint being destroyed. Thereby, it may be identified whether the release constraints are likely to be destroyed and, if so, which of the sub-constraint is likely to be destroyed. Thereby, corresponding proposal may be raised.

After forecasting whether the addition of additional requirement to the release plan will destroy the release constrains, the forecast and/or proposal is displayed in an appropriate form—for example, in an appropriate user interface.

In Step 249, the user may make changes to the current release plan based on the forecast, for example, relaxing a sub-constraint of the release constraints. The changes to the current release plan may be then saved in the file 221. Thereby an updated release plan may be created and treated as the current release plan.

In practical implementations, the user may be provided with the option of whether to proceed with the planning. If the user opts to continue the planning, the process of the method will return to Step 220 to run the procedures starting therefrom again.

An embodiment of generating a forecast of whether the addition of an additional requirement from the remaining requirements will break the release constraints through a linear programming model as described above will be illustrate below by way of example.

FIG. 3 is a tabular representation of exemplary requirements for an exemplary release according to an embodiment of the present invention. In one aspect, Table 1 of FIG. 3 illustrates ten requirements {R1, R2, . . . , R10} and their corresponding properties. For example, requirement R1 identifies a required cost of $2500 and a required labor resource of 25 person-months (PM).

Table 2 of FIG. 3 also illustrates two requirement relationships that identify relationships between requirements listed in Table 1.

Requirement relationship 1: "R1 is dependent on R2". For example, "money transfer" (R1) is dependent on "balance check" (R2).

Requirement relationship 2: "R5 and R6 are mutually exclusive". For example, "use DB2 to store transaction records" (R5) shall not be included in the same release as "use Oracle to store transaction records" (R6).

Requirement properties and requirement relationships are pre-determined prior to release planning. They are objective data for the process of release planning. Requirements, requirement properties and requirement relationships may all be saved in advance in a computer identifiable manner, e.g., in a requirement database 211.

For convenience of description hereinafter, it is assumed that the ten requirements shown in FIG. 3 are whole requirements that are expected to be included in a release plan, denoted as WR={R1, R2, R3, R4, R5, R6, R7, R8, R9, R10}. As shown in FIG. 2, in Step 210 the WR may be obtained from the requirement database 211 as initial remaining requirements of the current release plan.

FIG. 4 is a tabular representation of exemplary release constraints according to an embodiment of the present invention. The release constraints shown in Table 3 of FIG. 4 comprise three sub-constraints of two types: a "Budget" constraint, a "Resource" constraint and a "requirement relationship" constraint.

The "Budget" constraint shown in the first row of Table 3 is a numeric-typed (N) sub-constraint and is defined by text under "Description" and "Threshold", the description being "total cost needed to implement all requirements in the release" and the threshold being "$9000". According to this sub-constraint, total cost needed for implementing all requirements in the release shall not exceed $9,000.

The "Resource" constraint shown in the second row is a numeric-typed sub-constraint of the release constraints. According to the sub-constraint, "total estimated resource needed to implement all requirements in the release" shall not exceed the threshold of 100 PM (Person Month).

The "requirement relationship" sub-constraint shown in the third row is of logic type (L), which defines the requirement relationship of requirements. According to the description of the sub-constraint, "If one requirement is planned to the release, all requirements on which it depends should also be planned to the release".

Release planning is a progressive process of constantly adjusting the requirements included in the current release plan. The main goal is to include additional requirements into the current release plan subject to certain constraints, until a final release plan is achieved. Planned requirements, PR, are those requirements already included in any current release plan generated during release planning, so the content of planned requirements is dynamically changing. For the same reason, the content of remaining requirements, RR, also changes dynamically.

As initial input, release constraints may be pre-defined, and planned requirements may also be some of the whole requirements that are specified by the planner of release planning in advance. Release constraints and planned requirements may be saved in an intermediate file 221 and, in the process of release planning, the release constraints and the planned requirements may be adjusted or modified.

According to an embodiment of the present invention, the method further comprises determining whether there is a conflict between the planned requirements and the release constraints.

An example of a determining whether there is a conflict between the planned requirements and the release constraints is described below.

Example 1

Assuming that the remaining requirements RR obtained in Step 210 are WR={R1, R2, R3, R4, R5, R6, R7, R8, R9, R10} as shown in FIG. 3, and the release plan obtained in Step 220 comprises the release constraints shown in FIG. 4 and the planned requirements PR={R1, R2, R3, R7, R9}. After Step 220, the remaining requirements RR become {R4, R5, R6, R8, R10}.

It may be calculated that the total resource needed for PR={R1, R2, R3, R7, R9} in the release plan is 25+8+15+13+9=70 (PM), which does not exceed the threshold, 100 (PM), of the "Resource" constraint of the release constraints. Requirements R1 and R2 are both included in the release plan, also satisfying the "requirement relationship" constraint of the release constraints, namely, "if one requirement is planned to the release, all requirements on which it depends should also be planned to the release". However, the total cost needed for PR is 2500+900+2800+2500+1300=10000($), which exceeds the threshold, 9000($), of the "budget" constraint of the release constraints.

The planned requirements fail to satisfy one of the sub-constraints (in this case, the "budget" constraint). Thereby it may be determined that there is a conflict between the planned requirements and the release constraints.

In accordance with an embodiment of the present invention, rendering the proposal to modify the release plan generated according to the remaining requirements and the release plan comprises:

generating the proposal to modify the release plan according to the remaining requirements and the release plan; and displaying the proposal to modify the release plan on a user interface.

The proposal to modify the release plan modification is a proposal suggested to the user (or planner) for the resolution of the conflict between the planned requirements and the release constraints. It may take any one or any combination of the following:

removing a requirement in the planned requirements from the current release plan;

replacing a requirement in the planned requirements with a requirement in the remaining requirements; and relaxing the release constraints.

Generally speaking, a first priority of release constraints is higher than a first priority of requirements. Therefore, it is first considered to resolve the conflict by minimum adjustment of the requirements included in the release plan. Only when it is impossible to resolve the conflict by adjustment of requirement adjustment will it be considered to relax the release constraints to eliminate the conflict between the planned requirements and the relaxed release constraints.

In accordance with an embodiment of the present invention, a proposal to modify a release plan may be generated by the execution of a linear programming model created according to the remaining requirements and the release plan.

According to an embodiment of the present invention, the proposal to modify the release plan comprises at least one of the following: removing one or more requirements from the release plan; replacing one or more requirements in the release plan with one or more requirements in whole requirements; and modifying at least one sub-constraint in the release constrains.

It is known to those skilled in the art that linear programming models may be used for recommendation and prediction. Examples of prior art linear programming model engines include IBM's ILOG CPLEX, MathWorks' Matlab, LINDO's LINGO and so on. In practical implementations, a linear programming model may be created or selected as a function of which engine is being used.

The method of FIG. 2 may be augmented at the conclusion of the last iteration of steps 210-249 by steps that create a linear programming model as a function of the remaining requirements and of the most current version of the release plan. This model may include decision variables, model constraints, and an objective.

Decision variables: a decision variable D_REQi is created for each of the remaining requirements and the planned requirements in the release plan, REQi ($1<=i<=M$), wherein M is the total number of the remaining requirements RR and the planned requirements PR(for example, for WR shown in FIG. 3, M=10), D_REQi is either 1 or 0, "1" indicating that requirement REQi will be included in the release plan and "0" indicating that REQi will not be included in the release plan.

Model constraint: model constraint contains the release constraints in the release plan, such as the numeric-typed constraints ("budget" and "resource") and the logic-typed constraint ("requirement relationship") of the release constraints shown in FIG. 4.

In addition, model constraint may also specify requirements that must be retained in the release plan. For example, it may be specified that requirements R1 and R3 must be retained in the release plan.

Objective: to minimize the difference between the modified remaining requirements and the current remaining requirements. It is to be noted that this objective is only an example. In concrete implementations, objectives other than the above one may be defined.

The above linear programming model is solved on a linear programming model engine, i.e., find out a set of values for all decision variables D_REQi ($1<=i<=M$) that satisfy the model constraint and the objective. The above linear programming model may have a solution, or may have no solution.

Content of the proposal is then generated accordingly depending on whether or not there is a solution for the linear programming model.

Specifically, if there is a solution for the linear programming model, for any REQi ($0<=i<=M$), if REQi=0 and REQi belongs to planned requirements PR, it is recommended in the proposal that REQi be removed from PR; If REQi=1 and REQi does not belong to PR, it is recommended in the proposal that REQi be added to PR.

If there is no solution, it is recommended in the proposal to relax the destroyed constraints. For example, if it is determined that the "budget" constraint, which is a sun-constraint of the release constraints, is destroyed (or violated), then it is indicated in the proposal to raise threshold of budget.

The above implementation will be illustrated below by way of example.

Example 2

Assumptions: with respect to whole requirements WR as shown in FIG. 3, the planned requirements in the current release plan are {R1, R2, R3, R7, R9}; and, besides the release constraints shown in FIG. 4, the planner additionally specifies that R1 and R3 must be retained in the release plan.

Linear Programming Model 1:
Decision variables: D_REQ1, D_REQ2, D_REQ3, D_REQ4, D_REQ5, D_REQ6, D_REQ7, D_REQ8, D_REQ9, D_REQ10
Model Constraint:
(2500*D_REQ1+2800*D_REQ2+2500*D_REQ3+ 700*D_REQ4+800*D_REQ5+3400*D_REQ6+ 1300*D_REQ7+600*D_REQ8+900*D_REQ9+ 1100*D_REQ10)<9000;/*Budget constraint*/
(25*D_REQ1+8*D_REQ2+15*D_REQ3+7*D_REQ4+ 8*D_REQ5+14*D_REQ6+13*D_REQ7+ 6*D_REQ8+9*D_REQ9+12*D_REQ10)<100;/*resource constraint*/
D_REQ1=1;/*R1 must be retained*/
D_REQ3=1;/*R3 must be retained*/
D_REQ1-D_REQ3<=0;/*R1 depends on R3*/
D_REQ5+D_REQ6<=1./*R5 and R6 are mutually exclusive*/
Objective:
MIN ((1-D_REQ2)+D_REQ4+D_REQ5+D_REQ6+(1-D_REQ7)+D_REQ8+(1-D_REQ9)+D_REQ10)./*minimize the difference between the modified release plan and the current release plan*/

The linear programming model may be executed on the linear programming linear model engine, and the solution is D_REQ2=0. So, in the generated proposal to modify the release plan, it will be indicated that R2 should be removed from the current release plan.

The generated proposal to modify the release plan may be displayed in any appropriate way.

As shown in Step 239 of FIG. 2, the user may modify the release plan based on the proposal to modify the release plan. The user may modify the requirements included in the current release plan, and may also modify the release constraint included in the current release plan.

The arrow pointing to a file 221 from the dashed block 239 indicates that the user may save changes to the current release plan into file 221; thereby an updated release plan may be generated to serve as the current release plan.

In practical implementations, the user may be enabled to initiate the modification on the release plan at any time. In response, the process will return to Step 220 to execute subsequent procedures starting there for the current release plan again.

Figure 5A:
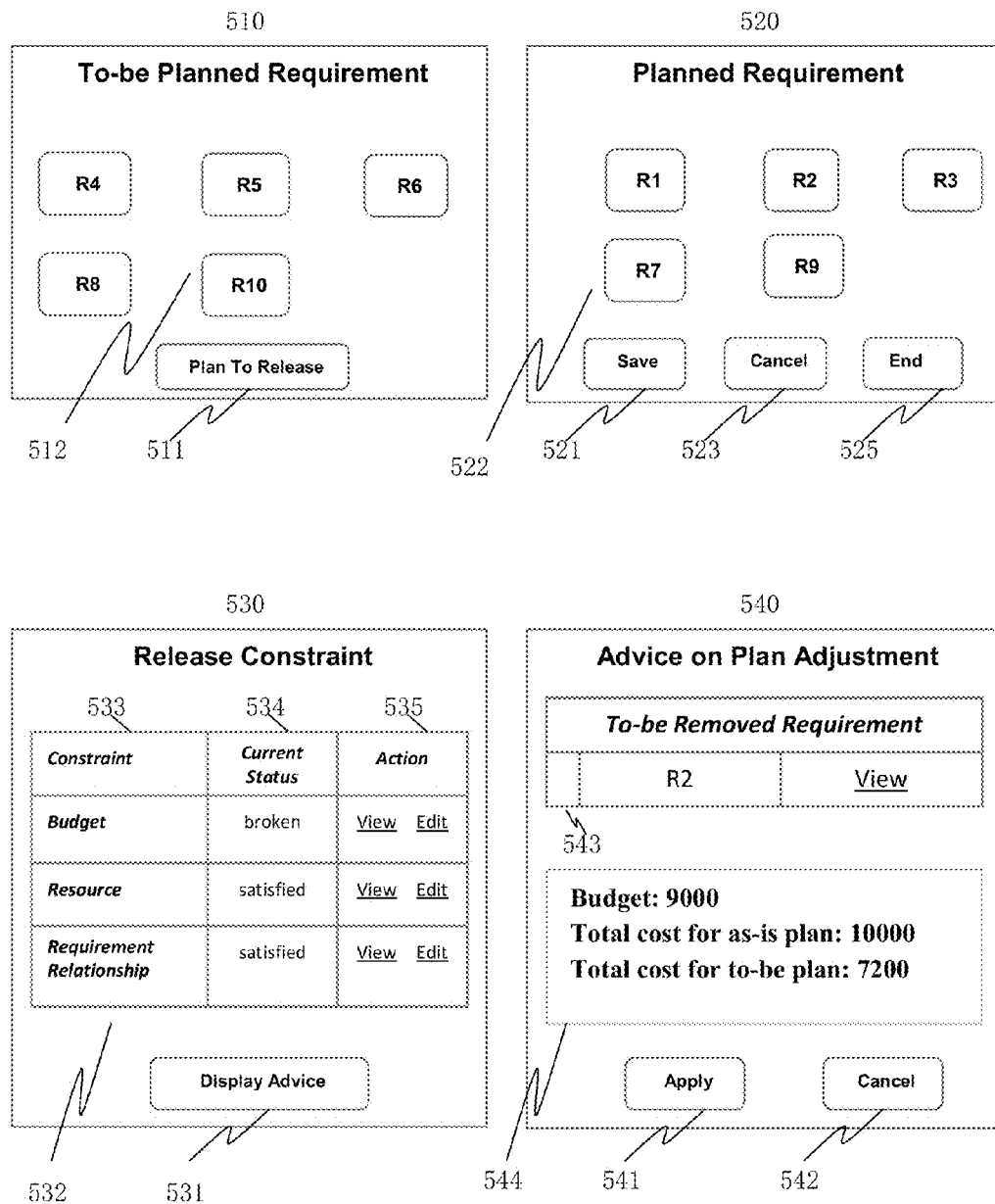
FIGS. 5A, 5B, 6, and 7 show interactive human-computer interfaces comprised by methods in accordance with embodiments of the invention.
Figure 5B:
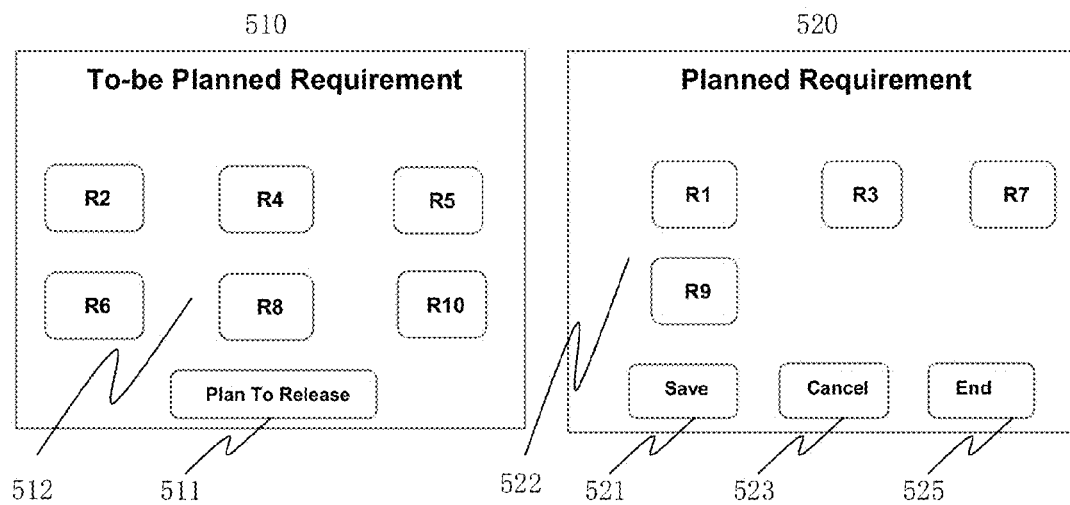
Figure 6:
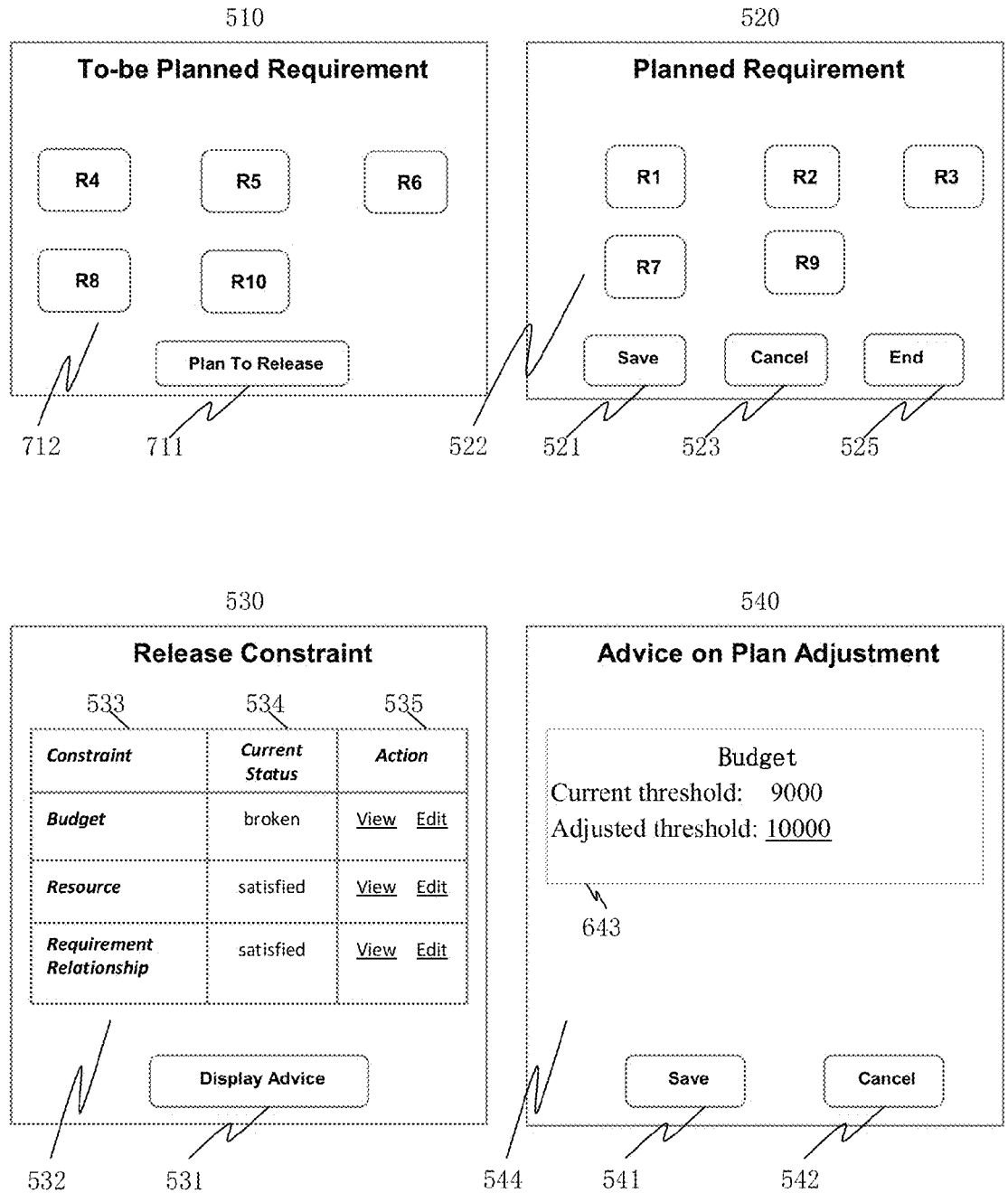

FIGS. 5A, 5B, and 6 illustrate the human-computer interaction process associated with Step 220 and Step 230 of FIG. 2.

FIG. 5A shows an interactive human-computer interface UI during the execution of the method according to an embodiment of the present invention.

The UI as shown is displayed on the displaying device of a computer in which the method according to the embodiment the invention is executed, and may comprise four sections or windows 510, 520, 530, and 540.

The first section 510, entitled "To-Be Planned Requirement," comprises a "Plan to Release" button 511 and five icons 512. Each icon 512 represents a remaining requirement. For example, requirement R8 is a remaining requirement. By clicking a particular icon 512 and then "Plan to Release" (meaning to add a plan to the release) button 511, the user may add the requirement represented by the particular icon 512 into the release plan.

As previously stated, in Step 210, remaining requirements are obtained. Initially, remaining requirements displayed in the first section 510 at the completion of Step 210 should be RR={R1, R2, R3, R4, R5, R6, R7, R8, R9, R10}, i.e., whole requirements. What is shown in FIG. 5A now is the UI in an intermediate state after Step 220. At this point of time, RR={R4, R5, R6, R8, R10}.

The second section 520, entitled "Planned Requirement," comprises a button 521, a button 523, a button 525, and five icons 522. Each icon 522 represents a planned requirement in the current release plan. For example, requirement R7 is a planned requirement. By clicking "Save" button 521, the user can save all planned requirements of the current release plan (e.g., into file 211). By clicking a particular icon 522 and then "Cancel" button 523, the user can cancel a planned requirement represented by the particular icon from the current release plan and the cancelled requirement will become a remaining requirement. The user may terminate the release planning process simply by clicking "End" button 525.

Assuming (e.g. in Step 220) that a user would like to select {R1, R2, R3, R7, R9} from {R1, R2, R3, R4, R5, R6, R7, R8, R9, R10} for inclusion into the planned release. In this case, remaining requirements RR shown in the first section 510 will become {R4, R5, R6, R8, R10} and the second section 520 will show the planned requirements PR={R1, R2, R3, R7, R9}.

The third section 530, entitled "Release Constraint," comprises a button 531 and a table 532. By clicking "Display Advice" button 531, the user may issue a request for generating and displaying a proposal to modify the release plan. The first column "Constraint" 533 of table 532 indicates sub-constraints of the release constraints, the second column "Current Status" 534 indicates current status of individual sub-constraints, and the third column "Action" 535 indicates actions that may be taken by the user on individual sub-constraints.

In this example, the sub-constraints listed in the first column 533 comprise budget constraints ("Budget"), resource constraints ("Resource"), and requirement relationship constraints ("Requirement Relationship").

The current status of individual sub-constraints represented by the second column 534 identify, respectively, that the budget constraint is broken ("broken"), the resource constraint is satisfied ("satisfied"), and the requirement relationship constraint is satisfied ("satisfied").

The third column 535 shows options "View" and "Edit" for each sub-constraints. By clicking the "view" option, the user may browse content of a corresponding sub-constraint. And by clicking the "Edit", the user may edit content of a corresponding sub-constraint.

The fourth section 540, entitled "Advice on Plan Adjustment," (meaning "proposal to modify the plan") comprises a button 541, a button 542, content of proposal 543, and detailed information 544.

The content of proposal 543 identifies a "To-be Removed Requirement" (the requirement recommended to be removed) R2, which is a requirement shown in the second section 520. The user may view details of the requirement by clicking the corresponding "View" option.

According to detailed information 544, threshold of the sub-constraint "budget" of the release constraints is $9000 ("Budget: 9000"), total cost of the current release plan is $10000 ("Total cost for as-is plan: 10000"), and total cost of the release plan after removal of R2 is $7200 ("Total cost for to-be plan: 7200").

As described above, the user may use these tools to modify the release plan.

If the user agrees with instructions in the content of proposal 543, he may click "Apply" button 541 to indicate that R2 shall be removed from the current release plan. Otherwise, he may click "Cancel" button 542. The user-made changes to the release plan will be received by the computer for subsequent processing.

It is to be noted that the above four sections 510, 520, 530, and 540 may be displayed within either a single UI or separate UIs.

Static description on the UI shown in FIG. 5A is provided above. Dynamic description of the UI will be given below in conjunction with Example 1 and Example 2.

As mentioned above, assuming that, at the start, remaining requirements obtained in Step 210 are RR={R1, R2, R3, R4, R5, R6, R7, R8, R9, R10}; at that point of time, icons 512 corresponding to the ten requirements will be displayed in the first section 510.

The planned requirements in the release plan obtained in Step 220 may come from user input. For example, the user may click icons 512 and button 521 to indicate the addition of requirements R1, R2, R3, R7 and R9 into the release plan, and then click "Save" button 521. The user actions will be received by the computer; thereby the planned requirements in the current release plan are obtained. At this time, the first section 510 will show R4, R5, R6, R8 and R10, and the second section 520 will show the planned requirements R1, R2, R3, R7 and R9.

Incidentally, if the user clicks "End" button 525, then the process shown in FIG. 2 will terminate; otherwise, the process proceeds to Step 230.

According to Example 1, total cost for the planned requirements, PR={R1, R2, R3, R7, R9}, is 2500+2800+2500+1300+900=10000($), exceeding the threshold, 9000 ($), of the budget constraint of the release constraints. Therefore, a conflict exists between the planned requirements and the released constraints. According to Example 2, the linear model 1 is executed on the linear programming model engine, resulting in D_REQ2=0. Therefore, in the generated proposal to modify the release plan, it is recommended that R2 be removed from the current release plan.

Therefore, as a result of the execution of Step 230, the fourth section 540 is displayed.

The user may click "Apply" button 541 to indicate removal of R2 from the current release plan. This action of the user will be received by the computer.

After the user modifies the release plan by removing R2 according to the proposal to modify the release plan, the first section 510 and the second section 520 in the UI are as shown in FIG. 5B. Reference numerals 510-525 represent items similar in scope and function to similarly labeled items in FIG. 5A.

In this example, the planned requirements shown in the second section 520 are changed to {R1, R3, R7, R9}, the remaining requirements shown in the first section 520 are changed to {R2, R4, R5, R6, R8, R10}.

In accordance with an embodiment of the present invention, Step 230 of rendering a proposal to modify the release plan generated according to the remaining requirements and the release plan in response to determining that there is a conflict between the release constraints and the planned requirements further comprises:

displaying content of the determined conflict in response to determining that there is a conflict between the release constraints and the planned requirements;

receiving a user request for displaying the proposal to modify the release plan; and rendering the proposal to modify the release plan generated according to the remaining requirements and the release plan in response to the user request for displaying the proposal to modify the release plan.

As shown in FIG. 5A, for example, according to Example 1, it is determined that there is a conflict between the release constraints and the planned requirements. Thus, content of the determined conflict is displayed, such as shown in the third section 530. As described above, the second column 534 of table 532 in the third section 530 displays the current status of individual sub-constraints. The user may become aware of the conflict between the release constraints and the planned requirements from the displayed message of "Budget" and "broken" meaning "budget constraint is broken".

The user may click "View" option in the third column 535 to browse content of the corresponding sub-constraint. Click the "Edit" option, content of the corresponding sub-constraint may be edited.

The user may click "Display Advice" button 531 to issue a request for generating and displaying the proposal to modify the release plan. This request will be received by the computer.

The computer displays the proposal to modify the release plan generated according to the remaining requirements and the release plan in response to the user request for displaying the proposal to modify the release plan, as shown in the fourth section 540.

The above description with reference to FIGS. 5A and 5B illustrates the situation that there is a solution for the linear programming model.

As mentioned above, according to an embodiment of the present invention, if there is no solution for the linear programming model, information may be provided, in the proposal, on how to relax the release constraints that are broken. For example, if it is determined in Step 230 that the sub-constraint "budget constraint" of the release constraints is destroyed (or violated), then it is indicated in the proposal to increase the value of threshold for the budget constraint.

Example 3

Assumptions: with respect to whole requirements WR as shown in FIG. 3, the planned requirements in the current release plan are {R1, R2, R3, R7, R9}; and, besides the release constraints shown in FIG. 4, the planner additionally specifies that {R1, R2, R3, R7, R9} must be retained in the release plan.

In a similar manner as in Example 2, a linear programming model 2 is created according to the remaining requirements and the release plan.

Linear Programming Model 2:
Decision variables: D_REQ1, D_REQ2, D_REQ3, D_REQ4, D_REQ5, D_REQ6, D_REQ7, D_REQ8, D_REQ9, D_REQ10
Model Constraint:
(2500*D_REQ1+2800*D_REQ2+2500*D_REQ3+
   700*D_REQ4+800*D_REQ5+3400*D_REQ6+
   1300*D_REQ7+600*D_REQ8+900*D_REQ9+
   1100*D_REQ10)<9000;/*Budget constraint*/
(25*D_REQ1+8*D_REQ2+15*D_REQ3+7*D_REQ4+
   8*D_REQ5+14*D_REQ6+13*D_REQ7+
   6*D_REQ8+9*D_REQ9+12*D_REQ10)<100;/*resource constraints*/
D_REQ1=1;/*R1 must be retained*/
D_REQ2=1;/*R2 must be retained*/
D_REQ3=1;/*R3 must be retained*/
D_REQ7=1;/*R7 must be retained*/
D_REQ9=1;/*R9 must be retained*/
D_REQ5+D_REQ6<=1./*R5 and R6 are mutually exclusive*/
Objective:
MIN ((1-D_REQ2)+D_REQ4+D_REQ5+D_REQ6+(1-D_REQ7)+D_REQ8+(1-D_REQ9)+D_REQ10)/
   *minimize the difference between the modified release plan and the current release plan*/

There is no solution for Linear Programming Model 2. In other words, as long as {R1, R2, R3, R7, R9} are retained in the release plan, the total cost of the release plan would exceed the threshold, $9000, of the budget, anyway.

In this example, the result of Step 230 is shown in FIG. 6.

FIG. 6 illustrates an implementation of the method according to another embodiment of the invention. The layout of the man-machine interface UI of FIG. 6 is substantially the same as FIG. 5A, except that content of the proposal 643 in the fourth section 640 in FIG. 6 is to recommend adjusting threshold of the budget ("Budget"). The current threshold ("Current threshold") is $9000 and it is recommended that the adjusted threshold ("Adjusted threshold") be $10000.

As shown in Step 239 of FIG. 2, the user may modify the release plan. If the user agrees with instructions in the content of proposal 643, he may click "Save" button 641, which means that the threshold shall be changed to 10000; Otherwise, he may click "Cancel" button 642. The user-made changes to the release plan will be received by the computer for subsequent processing.

If the user agrees with instructions in the content of proposal 543, he may click "Apply" button 541 to indicate that R2 shall be removed from the current release plan; Otherwise, he may click "Cancel" button 542. The user-made changes to the release plan will be received by the computer for subsequent processing.

The above description illustrates the handling of the situation that there is a conflict between the planned requirements and the release constrains.

Example 4

Assumptions: the planned requirements in the current release plan are {R1, R3, R7, R9}, the remaining requirements are {R2, R4, R5, R6, R8, R10}, the release constrains are the release constrains as shown in FIG. 4.

Linear Programming Model 3:
Decision Variables:
D_REQ2, D_REQ4, D_REQ5, D_REQ6, D_REQ8, D_REQ10 (D_REQi=0 or 1);/*decision variables that respectively correspond to the remaining requirements*/
D_RLS_Num_C1, D_RLS_NUM_C2 (D_RLS_Num_Ci=0 or 1)/*decision variables that respectively correspond to the budget constraint and the resource constraint of the release constraints*/
Model Constraint:
(2500+2800*D_REQ2+2500+700*D_REQ4+
   800*D_REQ5+3400*D_REQ6+1300+600*D_REQ8+
   900+1100*D_REQ10)*D_RLS_Num_C1<9000;
(25+8*D_REQ2+15+7*D_REQ4+8*D_REQ5+
   14*D_REQ6+13+6*D_REQ8+9+12*D_REQ10)
   *D_RLS_Num_C2<100;
D_REQ2+D_REQ4+D_REQ5+D_REQ6+D_REQ8+
   D_REQ10>0;/*Add at least one requirement from the remaining requirements to the release plan*/
D_REQ5+D_REQ6<=1;/*R5 and R6 are mutually exclusive*/
D_RLS_Num_C1+D_RLS_Num_C2>0;/*At least one of the budget constraint and the resource constraint will be destroyed*/
Objective:
MIN (D_REQ2+D_REQ4+D_REQ5+D_REQ6+
   D_REQ8+D_REQ10)/
MAX (D_RLS_Num_C1+D_RLS_Num_C2)/2

In this example, by solving the linear programming model on the linear programming model engine and analyzing the solutions, the forecast may be derived as the following.

Forecast: in the worst case, the budget constraints will be destroyed if R2 is added to the release plan.

According to an embodiment of the present invention, the forecast may be displayed directly in an interactive user interface.

According to an embodiment of the present invention, the proposal to modify the release plan generated according to the forecast may be may be displayed in the user interface.

In this example, the budget constraint is considered to be a bottleneck. So, it is recommended to relax the budget constraint, namely, change the threshold of the budget from $9,000 to $10,000 and, meanwhile, add the requirement R2 to the release plan.

Figure 7:
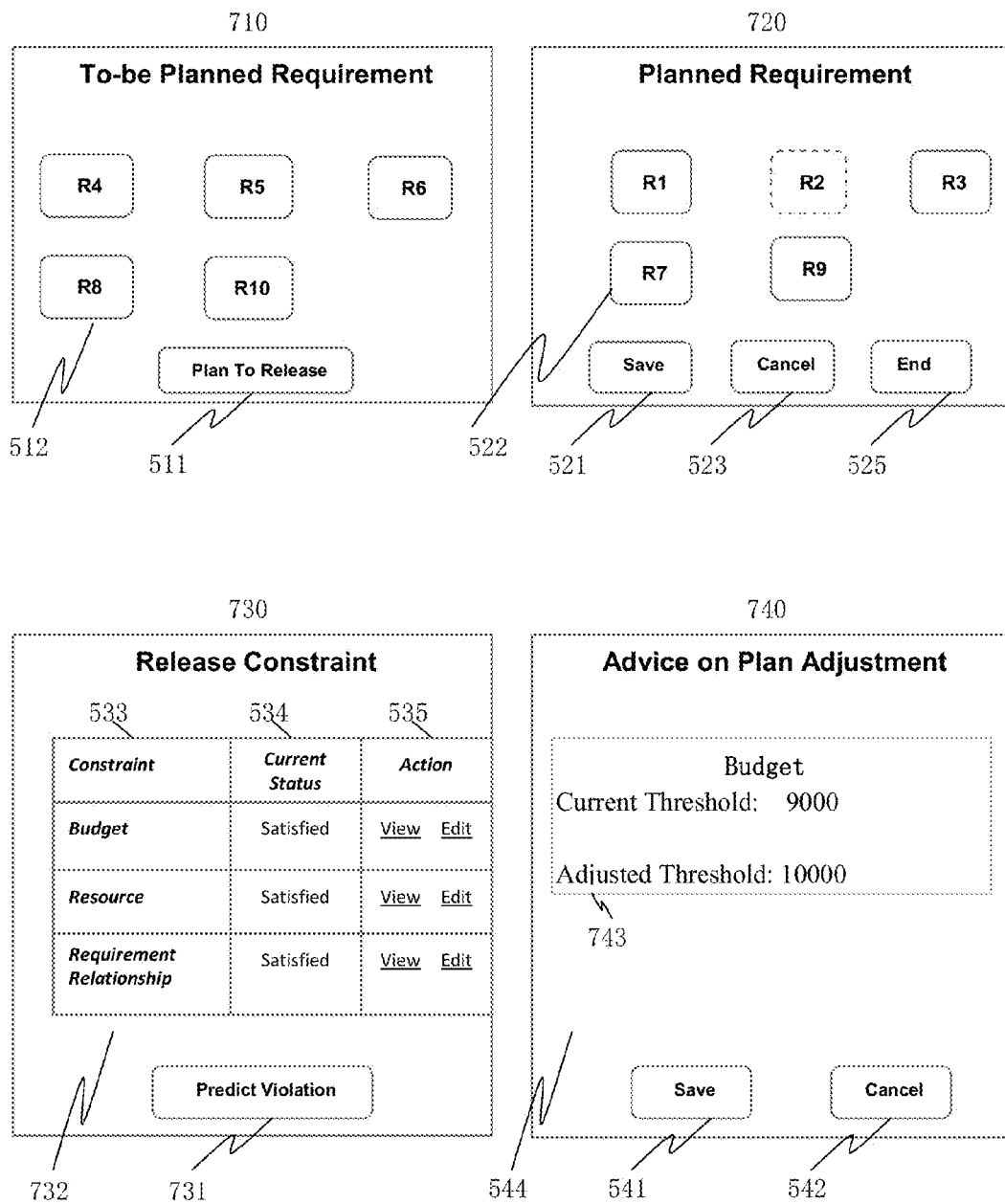

The result of Example 4 is illustrated in FIG. 5B and FIG. 7.

FIG. 7 illustrates an interactive human-computer interface during the execution of the method according to an embodiment of the present invention. The items identified by reference numerals 510-542 in FIGS. 6 and 7 are similar in scope and function to the similarly labeled items in FIG. 5A.

Assuming at some point in the process of release planning, the distribution of remaining requirements and planned requirements is as shown in FIG. 5B.

After performing Step 240 of FIG. 2, the UI that appears on the computer screen is shown by the first section 710 of FIG. 7, the second section 720, and the fourth section 740 of FIG. 7. As mentioned above, in the present example the forecast generated is that the budget constraints will be destroyed if R2 is added to the release plan. The second section 720 and the fourth section 740 display the forecast through the display of the proposal to modify the release plan. As suggested by the second section 720, R2 is recommended to be added to the release plan. The recommendation content 743 in the fourth section 740 is to adjust the threshold value of the budget ("Budget") to $10,000 ("Adjusted threshold") from $9,000 ("Current threshold").

As described above, the processor in Step 249 in FIG. 2, may then allow the user to revise the release plan.

If the user agrees with what is suggested in the recommendation content 743, he may click "Save" button 741, which means that the threshold of budget shall be changed to 10,000; otherwise, he may click "Cancel" button 542. The user-made changes to the release plan will be received by the computer for subsequent processing.

If the proposal is accepted by clicking "Save" button 741, the remaining requirements as shown in the first section 510 of FIG. 5B will be changed to the remaining requirements as shown in the first section 710 of FIG. 7.

The third section 730 represents an optional process. Table 732 shows that, according to the current distribution of remaining requirements and planned requirements, sub-constraints of the release plan are all met. If the user wants to continue planning, namely, to add any additional requirement to the current release plan, he may click "Predict Violation" button 731 to trigger the execution of Step 240.

The above description is about a manner of human-computer interaction to implement Step 240 according to an embodiment of the present invention. Those skilled in the art should appreciate that the invention is not limited to that. Apparently, in practical applications, there might be various other alternative implementations that may be used instead.

The method for assisting release planning according to various embodiments of the invention is described above. According to the same inventive concept, the present invention also provides an apparatus for assisting release planning.

Figure 8:
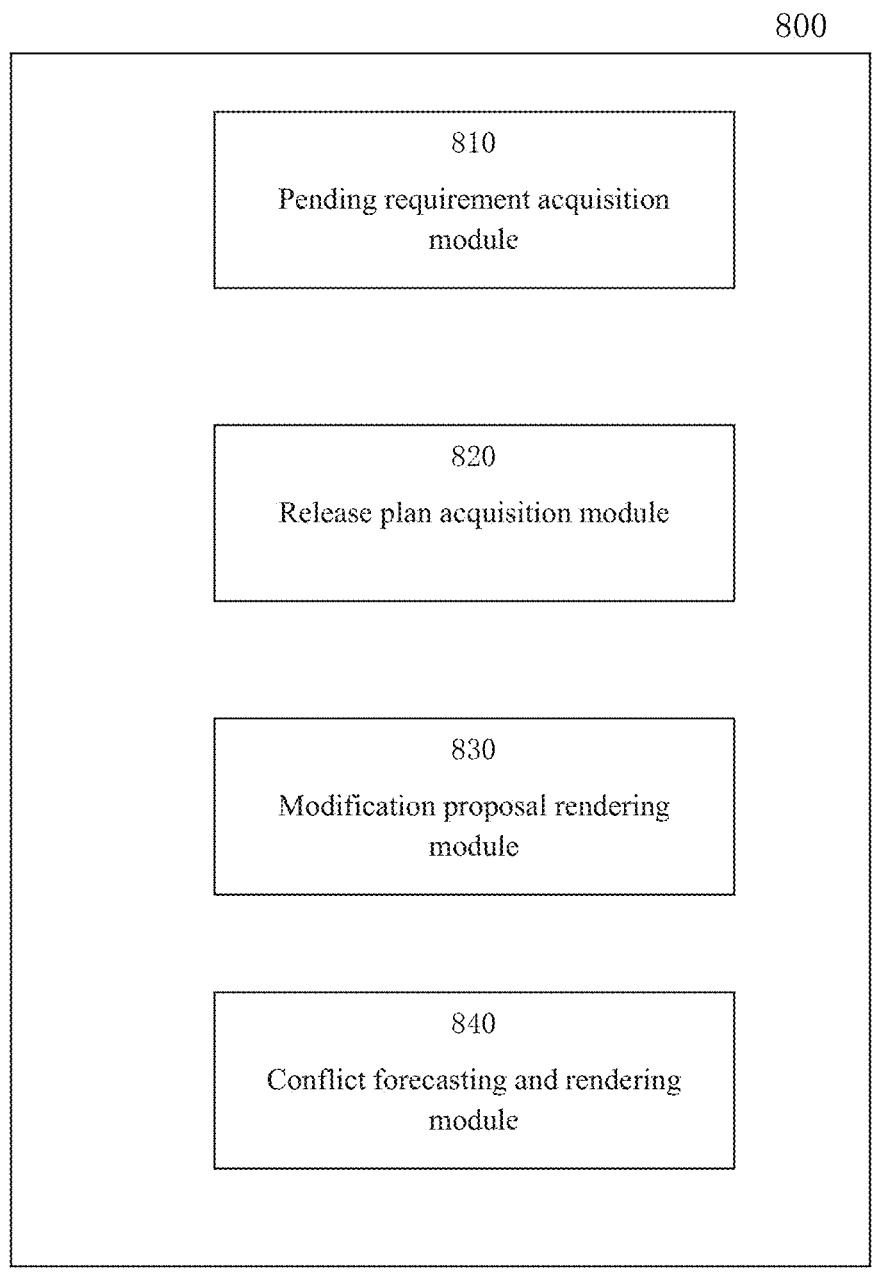
FIG. 8 is a block diagram of a computer-implemented apparatus for assisting release planning according to an embodiment of the present invention.

FIG. 8 is a block diagram of the computer implemented hardware or software apparatus for assisting release planning according to an embodiment of the present invention. As shown, the device 800 comprises a pending requirement acquisition module 810, a release plan acquisition module 820, a modification proposal rendering module 830 and a modification proposal rendering module 840.

The pending requirement acquisition module 810 is configured to obtain remaining requirements, which are the requirements expected to be included in a release plan.

The release plan acquisition module 820 is configured to obtain the release plan, which comprises release constraints and planned requirements that are already included in the release plan.

The modification proposal rendering module 830 is configured to render a proposal to modify the release plan, generated according to the remaining requirements and the release plan, in response to determining that there is a conflict between the release constraints and the planned requirements.

The conflict forecasting and rendering module 840 is configured to render a forecast, generated according to the remaining requirements and the release plan, of whether the addition of an additional requirement into the release plan will break the release constraints.

According to an embodiment of the present invention, the apparatus 800 further comprises a conflict judgment module configured to determine whether there is a conflict between the planned requirements and the release constraints.

According to an embodiment of the present invention, the modification proposal rendering module comprises: a proposal generation module configured to generate the proposal to modify the release plan according to the remaining requirements and the release plan; and a displaying module configured to display the proposal to modify the release plan on a user interface.

According to an embodiment of the present invention, the proposal generation module is configured to generate the proposal to modify the release plan by executing a linear programming model created according to the remaining requirements and the release plan.

According to an embodiment of the present invention, the apparatus 800 further comprises a module for displaying content of the determined conflict in response to determining that there is a conflict between the release constraints and the planned requirements and a module for receiving a user request for displaying the proposal to modify the release plan, wherein the modification proposal rendering module is further configured to render the proposal to modify the release plan generated according to the remaining requirements and the release plan in response to the user request for displaying the proposal to modify the release plan.

According to an embodiment of the present invention, the proposal to modify the release plan comprises at least one of the following: removing one or more requirements from the release plan, replacing one or more requirements in the release plan with one or more requirements in whole requirements, and modifying at least one sub-constraint in the release constrains.

According to an embodiment of the present invention, the conflict forecasting and rendering module 840 comprises a forecast generation module configured to generate a forecast of whether the addition of an additional requirement into the release plan will break the release constraints according to the remaining requirements and the release plan, and a forecast displaying module configured to display the generated forecast on the user interface.

According to an embodiment of the present invention, the forecast generation module is configured to generate a forecast of whether the addition of an additional requirement into the release plan will break the release constraints according to the remaining requirements and the release plan by the execution of a linear programming model created according to the remaining requirements and the release plan.

According to an embodiment of the present invention, the apparatus 800 further comprises a module configured to receive a user request for providing forecast, wherein the conflict forecasting and rendering module 830 is further configured to render a forecast, generated according to the remaining requirements and the release plan, of whether the addition of an additional requirement into the release plan will break the release constraints in response to the user request for providing forecast.

According to an embodiment of the present invention, the forecast displaying module is further configured to display the proposal to modify generated according to the remaining requirements and the release plan in a user interface.

The flowchart and block diagrams in FIGS. 1-8 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for updating an automated release plan for planned product release, the method comprising:
   a processor of a computer system receiving from a computerized release-planning system a current version of the automated release plan, a first list of planned requirements, a second list of release constraints, and a third list of remaining requirements,
      where the current version of the plan is required to meet the first list of planned requirements,
      where the current version of the plan is constrained by the second list of release constraints, and
      where a future version, but not the current version, of the plan will be required to meet the third list of remaining requirements;
   the processor determining that there is a conflict between the first list of planned requirements and the second list of release constraints, where the conflict identifies that one or more constraints of the second list constrains the current plan from meeting one or more planned requirements of the first list;
   the processor generating, in response to the determining, a modified version of the release plan that resolves the conflict;
   the processor creating a linear-programming model that updates the modified version of the release plan such that the updated version satisfies the third list of remaining requirements; and
   the processor predicting, as a function of the linear-programming model, whether requiring the update version of the release plan to meet an additional requirement comprised by neither the first list nor the third list would prevent the modified release plan, as constrained by the second list of release constraints, from meeting any requirement of the first list or of the third list.

2. The method of claim 1, wherein the rendering comprises:
   the processor displaying a description of the conflict to a user;
   the processor receiving a user request to display the modified version of the proposal in response to the displaying;
   the processor further displaying the modified version of the proposal; and
   the user receiving from the user the additional requirement in response to the further displaying.

3. The method of claim 1, further comprising:
   the processor, in response to predicting that requiring the modified version of the release plan to meet the additional requirement would not prevent the modified release plan, as constrained by the second list of release constraints, from meeting a requirement of the first list or of the third list, updating the linear-programming model to incorporate the additional requirement and adding the additional requirement and the third list to the first list.

4. The method of claim 1, further comprising:
   the processor, in response to predicting that requiring the modified version of the release plan to meet the additional requirement would prevent the modified release plan, as constrained by the second list of release constraints, from meeting a requirement of the first list or of the third list, adding the additional requirement to the third list; and
   the process repeating the generating a modified version of the release plan, the creating a linear-programming model and the predicting.

5. The method of claim 1, where the modified version of the automated release plan resolves the conflict by omitting the one or more planned requirements from the first list, the method further comprising:
   the processor deleting the one or more planned requirements from the first list.

6. The method of claim 1, where the modified version of the automated release plan resolves the conflict by omitting the one or more constraints of the second list, the method further comprising:
   the processor deleting the one or more planned constraints from the second list.

7. The method of claim 1, further comprising providing at least one support service for at least one of creating, integrating, hosting, maintaining, and deploying computer-readable program code in the computer system, wherein the computer-readable program code in combination with the computer system is configured to implement the receiving the determining, the generating, the creating, and the predicting.

8. A computer program product, comprising a computer-readable hardware storage device having a computer-readable program code stored therein, the program code configured to be executed by a processor of a computer system to implement a method for updating an automated release plan for a planned product release, the method comprising:

the processor receiving from a computerized release-planning system a current version of the automated release plan, a first list of planned requirements, a second list of release constraints, and a third list of remaining requirements,
where the current version of the plan is required to meet the first list of planned requirements,
where the current version of the plan is constrained by the second list of release constraints, and
where a future version, but not the current version, of the plan will be required to meet the third list of remaining requirements;
the processor determining that there is a conflict between the first list of planned requirements and the second list of release constraints, where the conflict identifies that one or more constraints of the second list constrains the current plan from meeting one or more planned requirements of the first list;
the processor generating, in response to the determining, a modified version of the release plan that resolves the conflict;
the processor creating a linear-programming model that updates the modified version of the release plan such that the updated version satisfies the third list of remaining requirements; and
the processor predicting, as a function of the linear-programming model, whether requiring the updated version of the release plan to meet an additional requirement comprised by neither the first list nor the third list would prevent the modified release plan, as constrained by the second list of release constraints, from meeting any requirement of the first list or of the third list.

9. The computer program product of claim 8, where the rendering comprises:
the processor displaying a description of the conflict to a user;
the processor receiving a user request to display the modified version of the proposal in response to the displaying;
the processor further displaying the modified version of the proposal; and
the user receiving from the user the additional requirement in response to the further displaying.

10. The computer program product of claim 8, further comprising:
the processor, in response to predicting that requiring the modified version of the release plan to meet the additional requirement would not prevent the modified release plan, as constrained by the second list of release constraints, from meeting a requirement of the first list or of the third list, updating the linear-programming model to incorporate the additional requirement and adding the additional requirement and the third list to the first list.

11. The computer program product of claim 8, further comprising:
the processor, in response to predicting that requiring the modified version of the release plan to meet the additional requirement would prevent the modified release plan, as constrained by the second list of release constraints, from meeting a requirement of the first list or of the third list, adding the additional requirement to the third list; and
the processor repeating the generating a modified version of the release plan, the creating a linear-programming model, and the predicting.

12. The computer program product of claim 8, where the modified version of the automated release plan resolves the conflict by omitting the one or more planned requirements from the first list, the method further comprising:
the processor deleting the one or more planned requirements from the first list.

13. The computer program product of claim 8, where the modified version of the automated release plan resolves the conflict by omitting the one or more constraints of the second list, the method further comprising:
the processor deleting the one or more constraints from the second list.

14. A computer system comprising a processor, a memory coupled to said processor, and a computer-readable hardware storage device coupled to said processor, said storage device containing program code configured to be run by said processor via the memory to implement a method for updating an automated release plan for a planned product release, the method comprising:
the processor receiving from a computerized release-planning system a current version of the automated release plan, a first list of planned requirements, a second list of release constraints, and a third list of remaining requirements,
where the current version of the plan is required to meet the first list of planned requirements,
where the current version of the plan is constrained by the second list of release constraints, and
where a future version, but not the current version, of the plan will be required to meet the third list of remaining requirements;
the processor determining that there is a conflict between the first list of planned requirements and the second list of release constraints, where the conflict identifies that one or more constraints of the second list constrains the current plan from meeting one or more planned requirements of the first list;
the processor generating, in response to the determining, a modified version of the release plan that resolves the conflict;
the processor creating a linear-programming model that updates the modified version of the release plan such that the updated version satisfies the third list of remaining requirements; and
the processor predicting, as a function of the linear-programming model, whether requiring the updated version of the release plan to meet an additional requirement comprised by neither the first list nor the third list would prevent the modified release plan, as constrained by the second list of release constraints, from meeting any requirement of the first list or of the third list.

15. The computer system of claim 14, where the rendering comprises:
the processor displaying a description of the conflict to a user;
the processor receiving a user request to display the modified version of the proposal in response to the displaying;
the processor further displaying the modified version of the proposal; and
the user receiving from the user the additional requirement in response to the further displaying.

16. The computer system of claim 14, further comprising:
the processor, in response to predicting that requiring the modified version of the release plan to meet the additional requirement would not prevent the modified release plan, as constrained by the second list of release constraints, from nice requirement of the first list or of the third list, updating the linear-programming model to incorporate the modification and adding the additional requirement and the third list to the first list.

17. The computer system of claim 14, further comprising:
the processor, in response to predicting that requiring the modified version of the release plan to meet the additional requirement would prevent the modified release plan, as constrained by the second list of release constraints, from meeting a requirement of the first list or of the third list, adding the additional requirement to the third list; and the processor repeating the generating a modified version of the release plan, the creating a linear-programming model, and the predicting.

18. The computer system of claim 14, where the modified version of the automated release plan resolves the conflict by omitting the one or more planned requirements from the first list, the method further comprising:
the processor deleting the one or more planned requirements from the first list.

19. The computer system of claim 14, where the modified version of the automated release plan resolves the conflict by omitting the one or more constraints of the second list, the method further comprising:
the processor deleting the one or more constraints from the second list.

\* \* \* \* \*